United States Patent
Cavanna et al.

(10) Patent No.: US 9,784,204 B2
(45) Date of Patent: Oct. 10, 2017

(54) METHOD TO DETECT AND CONTROL DETONATION PHENOMENA IN AN INTERNAL COMBUSTION ENGINE

(71) Applicant: MAGNETI MARELLI S.p.A., Corbetta (IT)

(72) Inventors: Filippo Cavanna, Bologna (IT); Riccardo Lanzoni, Imola (IT)

(73) Assignee: Magneti Marelli S.p.A., Corbetta (IT)

( * ) Notice: Subject to any disclaimer, the term of this patent is extended or adjusted under 35 U.S.C. 154(b) by 175 days.

(21) Appl. No.: 14/944,899

(22) Filed: Nov. 18, 2015

(65) Prior Publication Data

US 2016/0138551 A1    May 19, 2016

(30) Foreign Application Priority Data

Nov. 19, 2014   (IT) .............................. BO2014A0651

(51) Int. Cl.

| | |
|---|---|
| *F02D 41/24* | (2006.01) |
| *F02D 35/02* | (2006.01) |
| *F02P 5/152* | (2006.01) |
| *G01L 23/22* | (2006.01) |
| *F02D 41/00* | (2006.01) |
| *F02D 41/14* | (2006.01) |
| *F02D 41/28* | (2006.01) |

(52) U.S. Cl.
CPC ....... *F02D 41/2422* (2013.01); *F02D 35/027* (2013.01); *F02P 5/152* (2013.01); *G01L 23/22* (2013.01); *F02D 41/008* (2013.01); *F02D 2041/1432* (2013.01); *F02D 2041/286* (2013.01)

(58) Field of Classification Search
CPC . F02P 5/145; F02P 9/002; F02P 17/12; Y02T 10/46; F02D 35/027
USPC ............ 123/406.13, 406.14, 406.16, 406.21, 123/406.26, 406.29, 406.34, 406.37, 123/406.38, 406.39
See application file for complete search history.

(56) References Cited

U.S. PATENT DOCUMENTS

| | | |
|---|---|---|
| 6,591,660 B1 | 7/2003 | Franke et al. |
| 2007/0028893 A1 | 2/2007 | Hernandez |

FOREIGN PATENT DOCUMENTS

EP   1116946 A2   7/2001

OTHER PUBLICATIONS

Italian Search Report for Italian Patent Application No. BO2014A000651 dated Jul. 7, 2015.

*Primary Examiner* — Sizo Vilakazi
(74) *Attorney, Agent, or Firm* — Howard & Howard Attorneys PLLC

(57) ABSTRACT

Method to detect and control detonation phenomena in an internal combustion engine provided with a number of cylinders and with at least two detonation sensors. For each combustion cycle as a function of the cylinder and of the engine point that is being explored, the method comprises the steps of processing the signal coming from each detonation sensor so as to determine a detonation energy for each detonation sensor; calculating a detonation index for each detonation sensor and controlling the internal combustion engine as a function of a total detonation index through the algebraic sum of the detonation indexes for each detonation sensor.

12 Claims, 3 Drawing Sheets

METHOD TO DETECT AND CONTROL DETONATION PHENOMENA IN AN INTERNAL COMBUSTION ENGINE

CROSS-REFERENCE TO RELATED APPLICATIONS

The present application claims priority to and all the benefits of Italian Patent Application No. BO2014A000651, filed on Nov. 19, 2014, which is hereby expressly incorporated herein by reference in its entirety.

BACKGROUND OF THE INVENTION

1. Field of the Invention

The present invention relates to a method to detect and control detonation phenomena in an internal combustion engine.

2. Description of the Related Art

A spark ignition internal combustion engine includes a number of cylinders, each of which is provided with a piston which cyclically slides inside the cylinder and with a spark plug which is cyclically driven by an electronic control unit to make a spark between its electrodes and thus ignite the compressed gases inside the cylinder. The control unit comprises a memory storing a series of maps that provide the spark plug controlling values as a function of the current engine point. In particular, for each spark plug, the maps provide the value of the ignition advance, i.e. the value of the rotational movement between the ignition, namely the spark between the spark plug electrodes, and the top dead centre or TDC of the piston. If the value of the ignition advance is zero, then the ignition, i.e. the spark between the spark plug electrodes, takes place exactly in correspondence of the top dead centre or TDC of the piston.

The ignition advance values stored in the maps contained in the control unit are set during the engine tuning step, trying to ensure a good combustion under all possible operating conditions to have a good thermal efficiency of the engine and, at the same time, to guarantee the integrity of the engine, namely to avoid the presence of excessive detonation phenomena inside the cylinders. The detonation is an explosive-type combustion of part of the air-fuel mixture occurring before the mixture is reached by the flame front generated by the spark plug. The detonation creates a series of pressure waves that pass through the combustion chamber, violently striking against the metal walls. The detonation occurs when inside the chamber certain critical temperature and pressure values (which can quite considerably vary from engine to engine) are exceeded and, when this occurs at medium-low speed, it often causes a typical metal noise, clearly perceptible and known as "knocking".

The detonation normally occurs when the ignition advance is excessive, when it has been used a fuel with a too low octane number (the antiknock power of the fuel is precisely indicated by its octane number) or in supercharged engines, when the supercharging pressure is too high. The combustion progress is influenced by many factors (among which the most important are the fuel characteristics, the temperature of the engine cylinder head, the spark plugs degradation), whose effect is substantially impossible to predict accurately.

For this reason it is necessary to detect the possible presence of an excessive detonation and, in case of an excessive detonation in a cylinder, the control unit must promptly react to avoid the recurrence of detonating phenomena also in combustion cycles subsequent to the combustion cycle in which the detonation has been detected.

SUMMARY OF THE INVENTION

The object of the present invention is to provide a method to detect detonation phenomena in an internal combustion engine, wherein the method is free from the aforesaid drawbacks and, in particular, having an economical and easy implementation.

A further object of the present invention is to provide an electronic control unit to detect detonation phenomena in an internal combustion engine, wherein the unit is free from the drawbacks of the state of the art.

Accordingly, the present invention is directed toward a method to detect and control detonation phenomena in an internal combustion engine provided with a number of cylinders and with at least two detonation sensors, in particular two accelerometers. The method comprises the steps of: acquiring the signal coming from each detonation sensor; processing the signal coming from each detonation sensor so as to determine a detonation energy for each detonation sensor; determining a first indicator ($\alpha$) for each detonation sensor as a function of the cylinder and of the engine point that is being explored, univocally identified by the revolutions per minute (rpm) and by the load; wherein the first indicator ($\alpha$) is variable as a function of the observability of the detonation phenomena for each detonation sensor; defining a second global indicator ($\beta$) of observability of the combustion at a given engine point for a cylinder, in which the combustion can be fully observable by both detonation sensors or by a predetermined detonation sensor, or partially observable by the two detonation sensors or not observable by any of the detonation sensors; and controlling the ignition advance implemented for the cylinder in the next combustion cycle, as a function of the second global indicator ($\beta$) of observability of the combustion at the given engine point for the cylinder.

Other objects, features and advantages of the present invention will be readily appreciated as the same becomes better understood after reading the subsequent description taken in connection with the accompanying drawings.

DETAILED DESCRIPTION OF THE INVENTION

Figure 1:
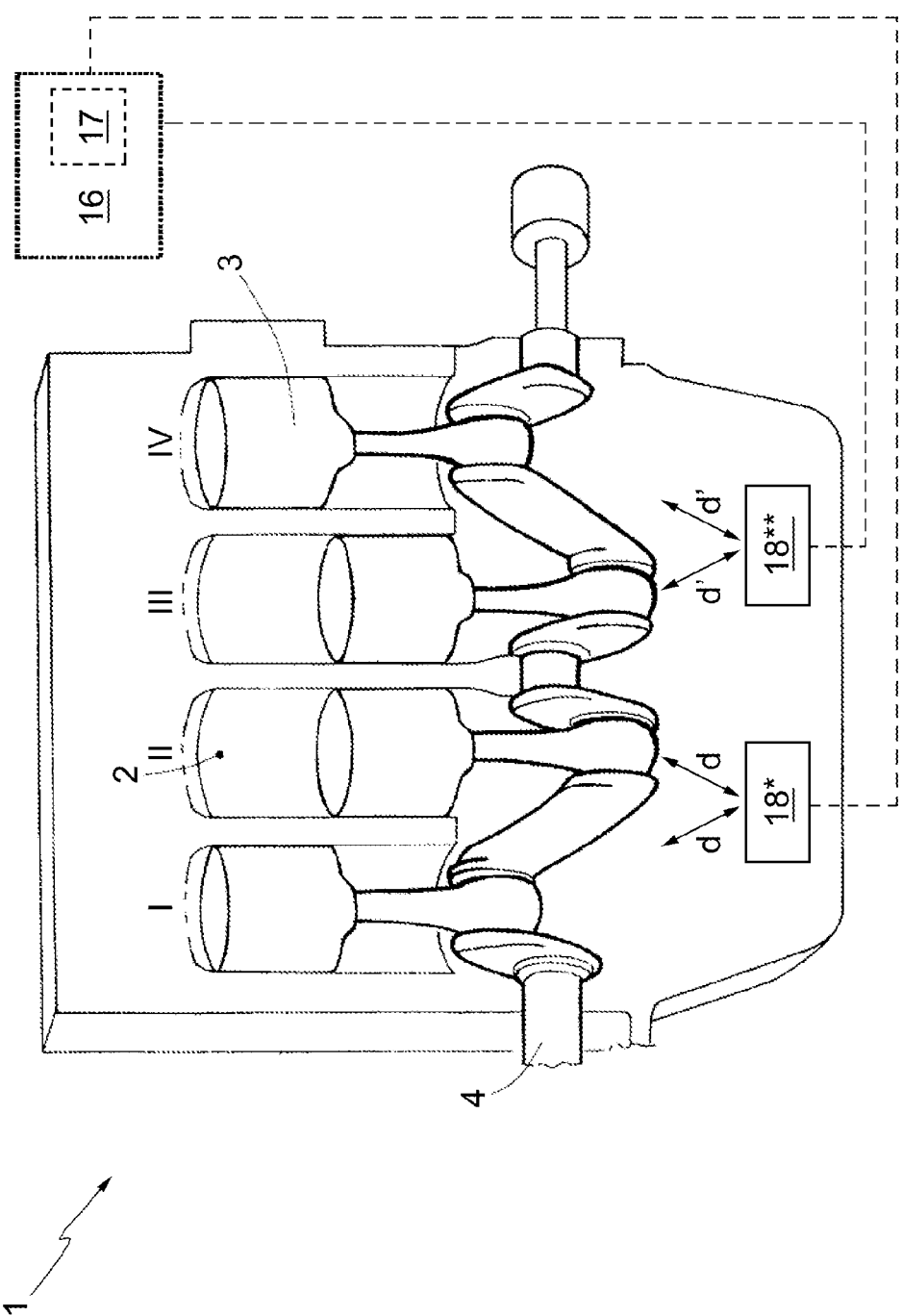
FIG. 1 is a schematic view of an internal combustion engine provided with a control unit that implements the method to detect detonation phenomena object of the present invention.

In FIG. 1, reference number 1 indicates as a whole a spark ignition internal combustion engine comprising four cylinders 2 arranged in line. Each cylinder 2 accommodates a respective piston 3 mechanically connected by a connecting rod to a motor shaft 4 to transmit to the motor shaft 4 the force generated by the combustion inside the cylinder 2.

Figure 2:
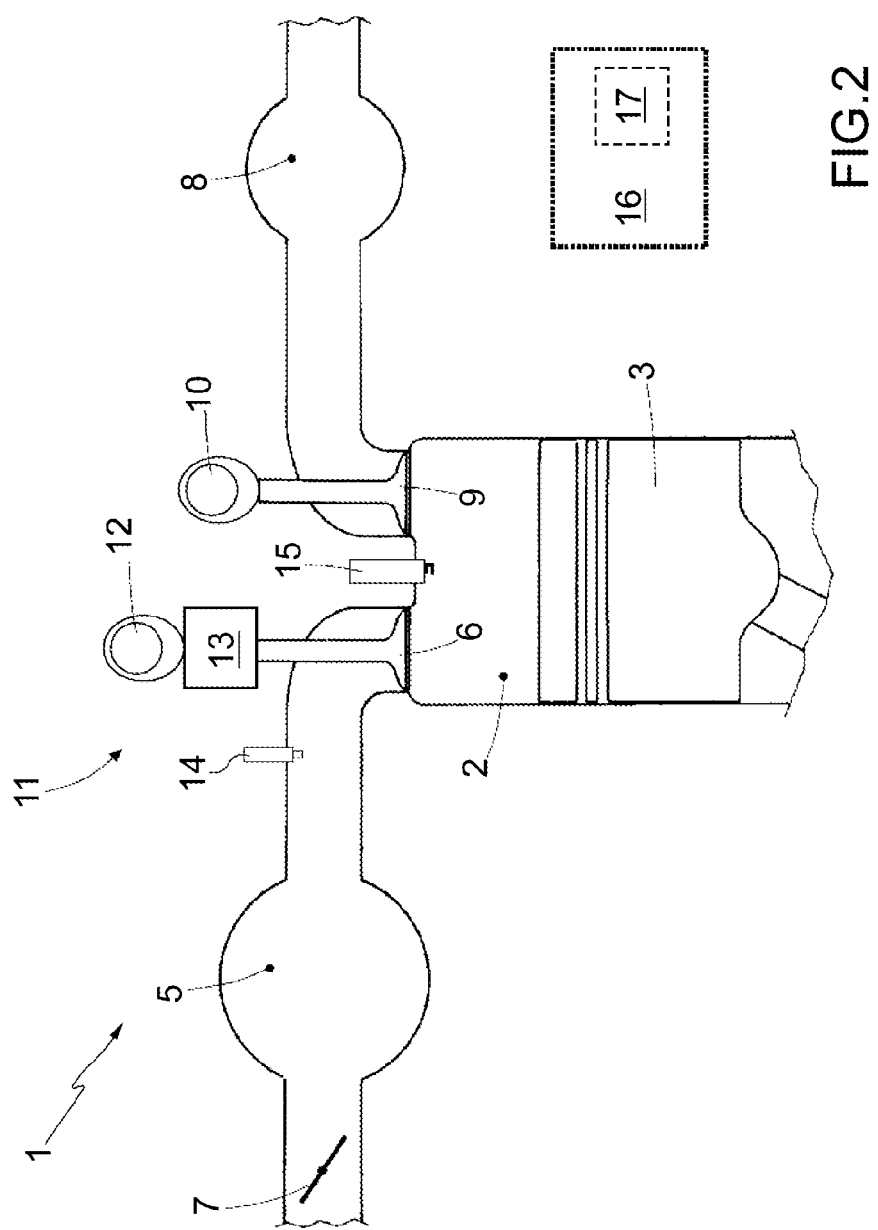
FIG. 2 is a schematic view of a cylinder of the internal combustion engine of FIG. 1.

As shown in FIG. 2, the internal combustion engine 1 comprises an intake manifold 5 which is connected to each cylinder 2 by two intake valves 6 (only one of which is illustrated in FIG. 2) and receives fresh air (i.e. air from the external environment) through a throttle 7 movable between a closed position and a maximum opening position. In addition, the internal combustion engine 1 comprises an exhaust manifold 8, which is connected to each cylinder 2 by two exhaust valves 9 (only one of which is illustrated in FIG. 2), flowing into an exhaust duct (not shown) to discharge the combustion gases into the atmosphere.

The position of each exhaust valve 9 is directly controlled by a cam shaft 10 moved by the motor shaft 4. The position of the intake valves 6 is controlled by a valve opening control device 11 which controls the opening angle and lifting movement of the intake valves 6 so as to control the torque delivered through the intake valves 6. The valve opening control device 11 uses a traditional cam shaft 12 which is moved by the motor shaft 4 and for each intake valve 6 comprises an electrically controlled (namely, controlled by a solenoid valve) hydraulic actuator 13, which is interposed between a stem of the intake valve 6 and the cam shaft 12. The motion transmitted from the cam shaft 12 to the intake valve stem 6, and then the actual lifting of the intake valve 6, can be adjusted by appropriately controlling each hydraulic actuator 13. Then, the control device 11 allows to vary the actual lifting of each intake valve 6 independently from the other intake valves 6 for each cylinder 2 and at each engine cycle.

Each cylinder 2 is provided with a corresponding injector 14. In accordance with the embodiment illustrated in FIG. 2, the injection is of the indirect type, and therefore each injector 14 is arranged upstream of the cylinder 2 in a suction duct which connects the intake manifold 5 to the cylinder 2. According to an alternative embodiment not shown, the injection is of the direct type, and therefore each injector 14 is partially arranged inside the cylinder 2.

Furthermore, each cylinder 2 comprises a spark plug 15, which is arranged across the top of the cylinder 2 in a central position between the intake valves 6 and the exhaust valves 9, and is cyclically activated to determine the ignition of the compressed gases within the cylinder 2 at the end of each compression step.

The engine 1 comprises a control unit 16, which supervises the operation of the combustion engine 1 and, among other things, controls the spark plugs 15 to determine the ignition of the compressed gases within each cylinder 2. The control unit 16 comprises a memory 17 storing a series of maps that provide the controlling values of the spark plugs 15 as a function of the current engine point; in particular, for each spark plug 15 (i.e. for each cylinder 2) the maps stored in the memory 17 provide a standard ignition advance.

The following example describes the strategy to detect and control detonation phenomena in an internal combustion engine 1 implemented by the control unit 16.

Figure 3:
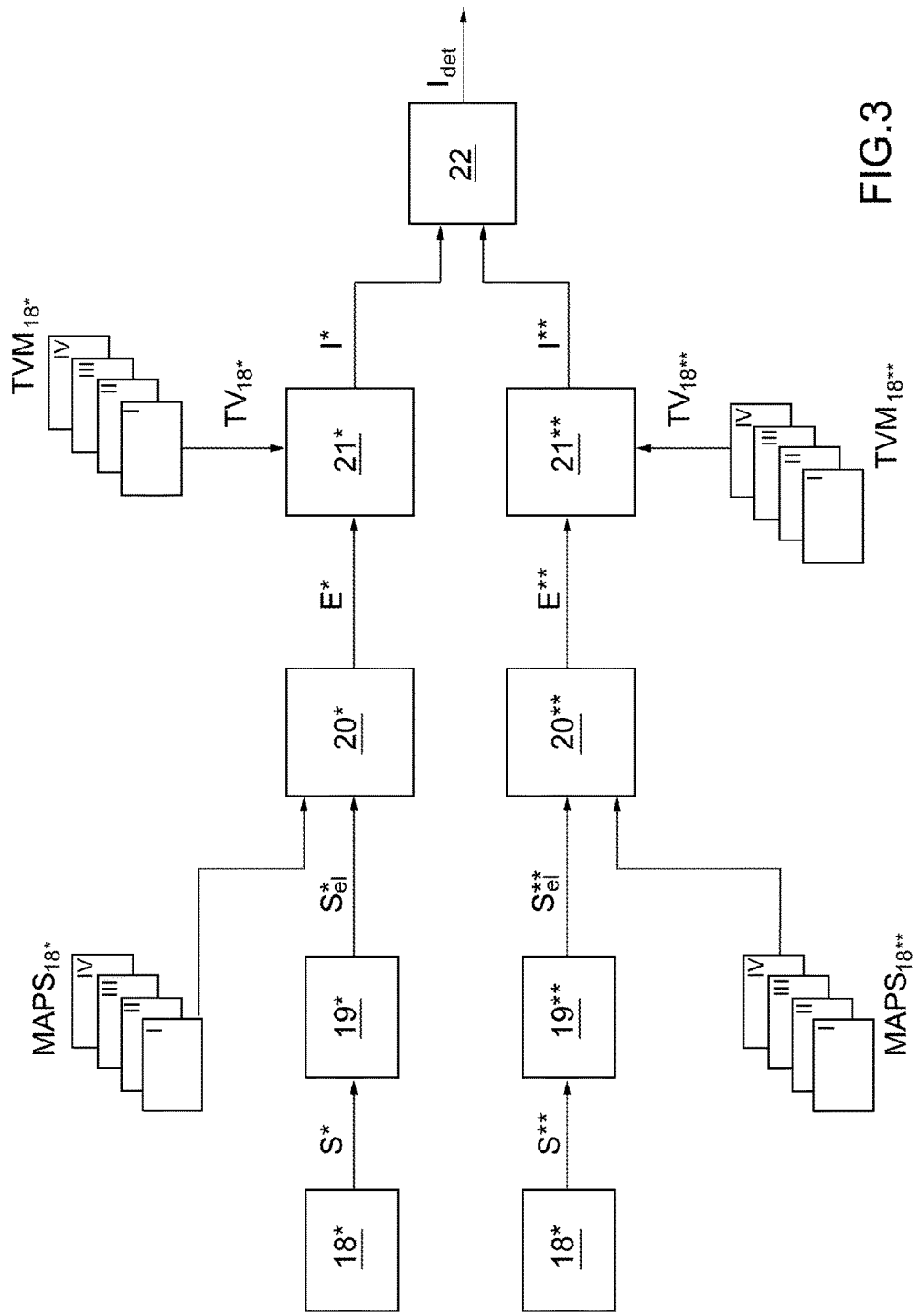
FIG. 3 is a block diagram of the method to detect detonation phenomena object of the present invention.

The detonation control mode which is implemented by the control unit 16 provides an indication of the intensity of the detonation phenomenon in an internal combustion engine 1 through an appropriate treatment of a signal by a pair of detonation sensors 18 connected to the control unit 16. According to a preferred variant, the detonation sensors 18 are a pair of accelerometers 18. In particular, the two accelerometers 18 are arranged in a position facing and close to the cylinders 2. According to what is illustrated in FIG. 3, an accelerometer 18\* is interposed between the cylinders 2 indicated by I and II at an equal distance from the cylinders 2 indicated by I and II. In other words, the accelerometer 18\* is arranged at a distance d from the cylinder 2 indicated by I and from the cylinder 2 indicated by II, and is arranged at greater and increasing distances from the cylinders 2, respectively indicated by III and IV. An accelerometer **18\*\* is interposed between the cylinders 2 indicated by III and IV at an equal distance from the cylinders 2 indicated by III and IV. In other words, the accelerometer 18\*\* is arranged at a distance d' from the cylinder 2 indicated by III and from the cylinder 2 indicated by IV, and is arranged at greater and increasing distances from the cylinders 2**, respectively indicated by II and I.

Firstly, the method to detect and control detonation phenomena defines, in a preliminary step of setting and tuning, for each accelerometer 18\*, **18\*\*, angular windows associated with the four cylinders 2 to detect any detonation. As already known, the complete combustion cycle is formed by four successive steps at the end of which two complete revolutions of the motor shafts 4 have occurred, thus exploring an angle equal to 720°. With reference to a direct injection system, during the intake step and/or the subsequent compression step and/or the subsequent expansion step, fuel is injected in the combustion chamber of the cylinder 2, and in the expansion step or in the final part of the previous compression step, the electrodes of a spark plug cause a spark that ignites the mixture of air and fuel inside the cylinder 2, thus starting the actual combustion that produces an increase of temperature and pressure. For each accelerometer 18\*, 18\*\*, the control unit 16 stores angular windows associated with the four cylinders 2 to detect detonating phenomena. In particular, the control unit 16 stores the initial value and the duration of the angular window associated with each of the four cylinders 2** in which possible detonations could be detected.

Furthermore, the method to detect and control detonation phenomena defines, in a preliminary step of setting and tuning, for each accelerometer 18\*, **18\*\*, frequency bands associated with the four cylinders 2 to detect any detonation. In particular, for each of the two accelerometers 18\*, 18\*\*, the control unit 16 stores the minimum value and the maximum value of the frequency band associated with each of the four cylinders 2** in which possible detonations could be detected.

FIG. 3 schematically illustrates the detonation control mode which is implemented by the control unit 16.

The block 19\* receives the signal S\* from the accelerometer 18\* and processes it to transmit it to the subsequent block 20\*. In particular, the signal S\* generated by the combustion in the cylinders 2 and acquired by the accelerometer 18\* is first filtered in the block 19\* by a band-pass filter.

In particular, the band-pass filter is made by providing a rather tight filtering around the harmonic with the maximum frequency in the frequency content of the signal S\* generated by the detonating combustion of the cylinders 2 and acquired by the accelerometer 18\*. The value of the upper cutoff frequency and the value of the lower cutoff frequency of the band-pass filter are determined as a function of the harmonic with the frequency of maximum amplitude in the frequency content of the signal S\* generated by the detonating combustion of the cylinders 2 and acquired by the accelerometer 18\*. In other words, the value of the upper cutoff frequency and the value of the lower cutoff frequency of the band-pass filter are variable as a function of the harmonic with the frequency of maximum amplitude in the frequency content of the signal S\* generated by the detonating combustion of the cylinders 2 and acquired by the accelerometer 18\*.

Once the signal S\* generated by the combustion of the cylinders 2 and acquired by the accelerometer 18\* has been filtered through the band-pass filter, an alternating signal is obtained, which is subsequently rectified.

According to one variant, starting from the rectified signal, its integral is calculated, and the integrated signal $S_{el}*$ is subsequently transmitted to the block 20*. As shown in FIG. 3, the processed signal $S_{el}*$, which has been filtered, rectified and integrated, is then transmitted to the block 20*. The processed signal $S_{el}*$ that is transmitted to the block 20* represents the combustion energy that is clearly dependent on the cylinder 2, on the engine point whose combustion is being observed and on the accelerometer 18* detecting the signal S* generated by the combustions in the cylinders 2.

Analogously, the block 19* receives the signal S from the accelerometer 18* and processes it to transmit it to the subsequent block 20**. In particular, the signal S generated by the combustions in the cylinders 2 and acquired by the accelerometer 18 is first filtered in the block 19**** by the band-pass filter.

In particular, the band-pass filter is made by providing a rather tight filtering around the harmonic with the maximum frequency in the frequency content of the signal S generated by the detonating combustion of the cylinders 2 and acquired by the accelerometer 18**. The value of the upper cutoff frequency and the value of the lower cutoff frequency of the band-pass filter are determined as a function of the harmonic with the frequency of maximum amplitude in the frequency content of the signal S generated by the detonating combustion of the cylinders 2 and acquired by the accelerometer 18. In other words, the value of the upper cutoff frequency and the value of the lower cutoff frequency of the band-pass filter are variable as a function of the harmonic with the frequency of maximum amplitude in the frequency content of the signal S generated by the detonating combustion of the cylinders 2 and acquired by the accelerometer 18**.

Once the signal S generated by the combustion of the cylinders 2 and acquired by the accelerometer 18**** has been filtered through the band-pass filter, an alternating signal is obtained, which is subsequently rectified.

According to one variant, starting from the rectified signal its integral is calculated and the integrated signal $S_{el}$ is subsequently transmitted to the block 20**. As shown in FIG. 3, the processed signal $S_{el}$, which has been filtered, rectified and integrated, is then transmitted to the block 20. The processed signal $S_{el}$ that is transmitted to the block 20 represents the combustion energy that is clearly dependent on the cylinder 2, on the engine point whose combustion is being observed and on the accelerometer 18** detecting the signal S generated by the combustions in the cylinders 2.

It has been experimentally verified that the combustion energy of each observed combustion (i.e. for the considered cylinder 2 at a given engine point) is variable between a minimum value that indicates the complete absence of detonation and a maximum value that indicates a completely detonating combustion. More in detail, it has been experimentally verified that the combustion energy of each combustion (i.e. for the considered cylinder 2 at a given engine point) assumes a log-normal distribution χ2. This log-normal distribution χ2 can be distorted in a known manner (i.e. by passing through a logarithmic curve) and transformed into a Gaussian or normal distribution, characterized by an average value μ1 and by a standard deviation σ1.

The block 20* receives the processed signal $S_{el}*$ coming from the block 19* and a further signal which is the indicator of the observability of the detonation by the accelerometer 18*. The control unit 16 stores a group of maps $MAPS_{18*}$. According to one variant, the group of maps $MAPS_{18*}$ includes a map $MAPS_{18*}$ for each cylinder 2 of the internal combustion engine 1. In turn, each map $MAPS_{18*}$ for each cylinder 2 of the internal combustion engine 1 comprises a number of cells variable as a function of the engine points that can be explored during the running of the internal combustion engine 1. Each map $MAPS_{18*}$ for each cylinder 2 of the internal combustion engine 1 comprises a number of cells univocally identified by the revolutions per minute (rpm) and by the load.

The processed signal $S_{el}*$ that is transmitted to the block 20*, which represents the combustion energy for a given cylinder 2 as a function of the engine point whose combustion is being observed, is updated by the signal which is the indicator of the observability of the detonation by the accelerometer 18*. In other words, the group of maps $MAPS_{18*}$ determines, as a function of the cylinder 2 whose combustion is being observed and as a function of the engine point, whether a possible detonation for that cylinder 2 at that particular engine point is completely or partially observable or is not observable by the accelerometer 18*.

The block 20* therefore determines the detonation energy E* of each observed combustion, namely for the considered cylinder 2 at a given engine point, which is variable between a null value, that indicates the complete absence of observability or the recognized complete absence of any detonation by the accelerometer 18* for the cylinder 2 at the considered engine point, and a value equal to the processed signal $S_{el}*$ that indicates the total observability of recognized detonations by the accelerometer 18* for the cylinder 2 at the considered engine point. In other words, the detonation energy E* of each observed combustion by the accelerometer 18*, namely for the considered cylinder 2 at a given engine point, is null when the combustion for the considered cylinder 2 at a determined engine point is not observable by the accelerometer 18* or when it is observable by the accelerometer 18* but is not detonating. Analogously, the detonation energy E* of each observed combustion by the accelerometer 18*, namely for the considered cylinder 2 at a given engine point, is positive when the combustion for the considered cylinder 2 at a given point motor is observable by the accelerometer 18* and is detonating.

According to one variant, the values of the group maps $MAPS_{18*}$ as a function of the cylinder 2 whose combustion is being observed and of the engine point univocally identified by the revolutions per minute (rpm) and by the load that is being explored are determined in a preliminary step of setting and tuning of the control unit 16.

Analogously, the block 20 receives the processed signal $S_{el}$ coming from the block 19 and a further signal which is the indicator of the observability of the detonation by the accelerometer 18**. The control unit 16 stores a group of maps $MAPS_{18}$. According to a preferred variant, the group of maps $MAPS_{18}$ includes a map $MAPS_{18}$ for each cylinder 2 of the internal combustion engine 1. In turn, each map $MAPS_{18}$ for each cylinder 2 of the internal combustion engine 1 comprises a number of cells variable as a function of the engine points that can be explored during the running of the internal combustion engine 1. Each map $MAPS_{18}$ for each cylinder 2 of the internal combustion engine 1 comprises a number of cells univocally identified by the revolutions per minute (rpm) and by the load.

The processed signal $S_{el}$ that is transmitted to the block 20**, which represents the combustion energy for a given cylinder 2 as a function of the engine point whose combustion is being observed, is updated by the signal which is the indicator of the observability of detonation by the accelerometer 18**. In other words, the group of maps $MAPS_{18}$ determines, as a function of the cylinder 2 whose combustion is being observed and as a function of the engine point, whether a possible detonation for the cylinder 2 at the given engine point is observable by the accelerometer 18\*.

The block 20\* therefore determines the combustion energy E in each detonating combustion observed, namely for the considered cylinder 2 at a given engine point, which is variable between a null value, that indicates the complete absence of observability or the recognized complete absence of any detonation by the accelerometer 18\*\* for the cylinder 2 at the considered engine point, and a value equal to the processed signal $S_{el}$ that indicates the total observability of recognized detonations by the accelerometer **18\*\* for the cylinder 2 at the considered engine point. In other words, the detonation energy E of each observed combustion by the accelerometer **18\*\*, namely for the considered cylinder 2 at a given engine point, is null when the combustion for the considered cylinder 2 at a given engine point is not observable by the accelerometer 18\*\*, or when it is observable by the accelerometer 18\*\* but is not detonating. Analogously, the detonation energy E of each observed combustion by the accelerometer **18\*\*, namely for the considered cylinder 2 at a given engine point, is positive when the combustion for the considered cylinder 2 at a given engine point is observable by the accelerometer 18\*\*** and is detonating.

According to a preferred variant, the values of the group maps $MAPS_{18}$ as a function of the cylinder 2 whose combustion is being observed and of the engine point univocally identified by the revolutions per minute (rpm) and by the load that is being explored are determined in a preliminary step of setting and tuning of the control unit 16**.

As it is clear from the foregoing description, one of the following four situations may occur: any detonation, as a function of the cylinder 2 whose combustion is being observed and of the engine point univocally identified by the revolutions per minute (rpm) and by the load that is being explored, is (completely or totally) observable, both by the accelerometer 18\* and by the accelerometer **18\*\*; any detonation, as a function of the cylinder 2 whose combustion is being observed and of the engine point univocally identified by the revolutions per minute (rpm) and by the load that is being explored, is (completely or totally) observable only by the accelerometer 18\* or only by the accelerometer 18\*\*; and any detonation, as a function of the cylinder 2 whose combustion is being observed and of the engine point univocally identified by the revolutions per minute (rpm) and by the load that is being explored, is (completely or totally) observable neither by the accelerometer 18\* nor by the accelerometer 18\*\***.

In the event that any detonation, as a function of the cylinder 2 whose combustion is being observed and of the engine point univocally identified by the revolutions per minute (rpm) and by the load that is being explored, is (completely or totally) observable by the accelerometer 18\*, the value of the combustion energy E* for the cylinder 2 whose combustion is being observed at a given engine point coming from the block 20\* is supplied to the block 21\*. The detonating combustion energy E* is variable between a null value that indicates the complete absence of detonation and a maximum value that indicates a fully detonating combustion. A modest detonation level is not always negative, since it allows to optimize the combustion (and thus maximize the thermal efficiency) and at the same time does not compromise the integrity of the internal combustion engine 1. For this reason, the control unit 16 could implement an "aggressive" strategy for the control of the ignition advance, according to which for each cylinder 2 the standard ignition advance is increased to bring it to the detonation onset, or even to obtain a modest detonation level so as to optimize the combustion. To this regard, the control unit 16 stores a group of maps $TVM_{18*}$. According to one variant, the group of maps $TVM_{18*}$ includes a map $TVM_{18*}$ for each cylinder 2 of the internal combustion engine 1. In turn, each map $TVM_{18*}$ for each cylinder 2 of the internal combustion engine 1 comprises a number of cells variable as a function of the engine points that can be explored during the running of the internal combustion engine 1. Each map $TVM_{18*}$ for each cylinder 2 of the internal combustion engine 1 comprises a number of cells univocally identified by the revolutions per minute (rpm) and by the load.

The control unit 16 is designed to compare the combustion energy E* of each observed combustion, namely for the considered cylinder 2 at a given engine point, with a threshold value $TVM_{18*}$ of the combustion energy which is provided by the group of maps $TVM_{18*}$ as a function of the cylinder 2 whose combustion is being observed and of the engine point univocally identified by the revolutions per minute (rpm) and by the load that is being explored. The threshold value $TVM_{18*}$ of the combustion energy represents the maximum noise level acceptable for the combustion that for its violence is particularly dangerous for the integrity of the internal combustion engine 1.

In the event that it is detected a value of the combustion energy E* for the considered cylinder 2 at a given engine point higher than the threshold value $TVM_{18*}$ of the combustion energy which is provided by the group of maps $TVM_{18*}$ as a function of the cylinder 2 whose combustion is being observed and of the engine point that is being explored, univocally identified by the revolutions per minute (rpm) and by the load, the control unit is configured to determine a detonation index I*. The detonation index I* is given by the algebraic difference between the value of the combustion energy E* for the considered cylinder 2 at a given engine point and the threshold value $TV_{18*}$ of the combustion energy which is provided by the group of maps $TV_{18*}$ as a function of the cylinder 2 whose combustion is being observed engine and of the engine point that is being explored, univocally identified by the revolutions per minute (rpm) and by the load.

Analogously, when any detonation, as a function of the cylinder 2 whose combustion is being observed and of the engine point univocally identified by the revolutions per minute (rpm) and by the load that is being explored, is (completely or totally) observable by the accelerometer **18\*\*, the value of the combustion energy E for the cylinder 2 whose combustion is being observed at a given engine point coming from the block **20\*\* is supplied to the block 21\*\*. The control unit 16** stores a group of maps $TVM_{18*}$*. According to one variant, the group of maps $TVM_{18}$ includes a map $TVM_{18}$ for each cylinder 2 of the internal combustion engine 1. In turn, each map $TVM_{18}$ for each cylinder 2 of the internal combustion engine 1 comprises a number of cells variable as a function of the engine points that can be explored during the running of the internal combustion engine 1. Each map $TVM_{18}$ for each cylinder 2 of the internal combustion engine 1 comprises a number of cells univocally identified by the revolutions per minute (rpm) and by the load.

The control unit 16 is designed to compare the combustion energy E of each observed combustion, namely for the considered cylinder 2 at a given engine point, with a threshold value $TV_{18}$ of the combustion energy which is provided by the group of maps $TVM_{18}$ as a function of the cylinder 2 whose combustion is being observed and of the engine point univocally identified by the revolutions per minute (rpm) and by the load that is being explored. The threshold value $TV_{18}$ of the combustion energy represents the maximum noise level acceptable for the combustion that for its violence is particularly dangerous for the integrity of the internal combustion engine 1.

In the event that it is detected a value of the combustion energy $E$ for the considered cylinder 2 at a given engine point higher than the threshold value $TV_{18}$ of the combustion energy which is provided by the group of maps $TVM_{18}$ as a function of the cylinder 2 whose combustion is being observed and of the engine point that is being explored, univocally identified by the revolutions per minute (rpm) and by the load, the control unit is configured to determine a detonation index $I$. The detonation index $I$ is given by the algebraic difference between the value of the combustion energy $E$ for the considered cylinder 2 at a given engine point and the threshold value $TV_{18}$ of the combustion energy which is provided by the group of maps $TVM_{18}$ as a function of the cylinder 2 whose combustion is being observed and of the engine point that is being explored univocally identified by the revolutions per minute (rpm) and by the load.

Both the detonation index $I**$ and the detonation index $I*$ are provided to a calculation module 22 that is configured to calculate the total detonation index I. The total detonation index I is given by the algebraic sum of the detonation index $I**$ and the detonation index $I*$.

Depending on the detonation index $I**$, on the detonation index $I*$ (and, therefore, on the total detonation index I), the control unit 16 is configured to perform different types of intervention to limit the detonation in the cylinder 2: reducing the ignition advance starting from the combustion cycle next to the combustion cycle in which a detonation has been observed and/or reducing the mass of air taken in by the cylinder 2 starting from the combustion cycle next to the combustion cycle in which the presence of an excessive detonation has been observed by acting on the valve opening control device 11 which controls the intake valves 6 of the cylinder 2 (by reducing the density of the charge in the cylinder 2, the developed energy and the detonation probability are also reduced) and simultaneously by analogously reducing the mass of fuel injected into the cylinder 2 so as not to vary the air/fuel ratio which must remain at a desired value.

According to a preferred embodiment, in the case in which the group of maps $MAPS_{18*}$ defines that any detonation is fully observable by the accelerometer 18* for the cylinder 2 at the engine point whose combustion is being observed, and the group of maps $MAPS_{18}$ defines that any detonation is fully observable by the accelerometer 18 for the cylinder 2 at the engine point whose combustion is being observed, the control unit 16 is configured to compare the processed signal $S_{el}*$ acquired by the accelerometer 18* with the processed signal $S_{el}$ acquired by the accelerometer 18. In the case where the absolute value difference between the processed signal $S_{el}*$ acquired by the accelerometer 18* and the processed signal $S_{el}$ acquired by the accelerometer 18 representing the combustion energy for the cylinder 2 at the engine point whose combustion is being observed is greater than a tolerance value (preferably determined in a preliminary step of setting and tuning) for a number of successive combustion cycles (in which the number of successive combustion cycles is also determined in a preliminary step of setting and tuning), the control unit 16 is configured to diagnose a malfunction for an accelerometer 18*, 18**. In particular, in order to understand which accelerometer 18*, 18** is damaged, the control unit 16 is configured to compare both the processed signal $S_{el}*$ acquired by the accelerometer 18* and the processed signal $S_{el}$ acquired by the accelerometer 18 with respective tolerance values which are preferably determined in a preliminary setting step and are variable as a function of the cylinder 2 whose combustion is being observed, as a function of the accelerometer 18*, 18** and of the engine point that is being explored. The tolerance values represent the combustion energy expected for the cylinder 2 whose combustion is being observed, as a function of the accelerometer 18*, 18** and as a function of the engine point that is being explored. Depending on the difference between the processed signal $S_{el}*$ acquired by the accelerometer 18* and the respective tolerance value, and on the difference between the processed signal $S_{el}$ acquired by the accelerometer 18 and the respective tolerance value, it is determined which accelerometer 18*, 18** is affected by failures or malfunctions.

In this case, it is possible to update the indicator of the observability of detonation phenomena for the respective detonation sensor 18*, 18 provided by the group of maps $MAPS_{18}$ or by the group of maps $MAPS_{18*}$ for the cylinder 2 at the engine point whose combustion is being observed as a function of the comparison between the processed signal $S_{el}*$ acquired by the accelerometer 18* and the processed signal $S_{el}$ acquired by the accelerometer 18. In other words, the control unit 16 is configured to make not observable any detonation for the cylinder 2 at the engine point whose combustion is being observed by the accelerometer 18* or by the accelerometer 18**, respectively updating the group of maps $MAPS_{18*}$ or the group of maps $MAPS_{18*}*$.

In the event that any detonation is fully observable by both accelerometers 18*, 18** it is therefore possible to use the processed signal $S_{el}*$ acquired by the accelerometer 18* to diagnose any malfunction of the accelerometer 18**, and vice versa.

The group of maps $MAPS_{18*}$ and the group of maps $MAPS_{18**}$ actually define whether we want to listen to the combustion, at a given engine point for a given cylinder 2 and by a specific accelerometer 18*, 18**.

Various scenarios may occur, given an engine point and a cylinder 2. When the combustion at a given engine point for a cylinder 2 is observable by both the accelerometers 18*, 18**, one proceeds as described in the aforesaid description. In this case the combustion at a given engine point for a given cylinder 2 is completely observable. When the combustion at a given engine point for a cylinder 2 is observable by a single accelerometer 18*, 18**, the processed signal $S_{el}*$, $S_{el}**$ acquired by the other accelerometer 18*, 18** is not used. Also in this case the combustion at a given engine point and for a given cylinder 2 is completely observable. When the combustion at a given engine point for a cylinder 2 is observable by a single accelerometer 18*, 18**, also the processed signal $S_{el}*$, $S_{el}**$ acquired by the other accelerometer 18*, 18** can be considered acceptable. In this case the combustion at a given engine point and for a given cylinder 2 is partially observable.

Alternatively, in case the combustion at a given engine point for a cylinder 2 is observable by a single accelerometer 18*, 18**, the processed signal $S_{el}*$, $S_{el}**$ acquired by the other accelerometer 18*, 18** is considered not acceptable. In this case the combustion at a given engine point and for a given cylinder 2 is not observable.

The complete/partial/absent observability of the combustion at a given engine point for a cylinder 2 is used to define a degradation of ignition advance in open-loop to be applied to successive combustion cycles; if the combustion at a given engine point and for a particular cylinder 2 is fully observable, there is no need to apply any further degradation of ignition advance in open-loop beside the one possibly determined by the detonation control. In case the combustion at a given engine point and for a given cylinder 2 is partially observable or not observable, the ignition advance in open-loop is degraded to take into account the partial or absent observability of the detonation phenomena.

The previous description makes explicit reference to the case in which two accelerometers 18* and 18** are provided, but the method to detect and control detonation phenomena in an internal combustion engine 1 can find advantageous application with a different number of accelerometers 18. According to a first variant, for example, the internal combustion engine 1 includes three accelerometers 18, wherein a first accelerometer is interposed between the cylinders 2 indicated by I and II at an equal distance from the cylinders 2 indicated by I and II, a second accelerometer is interposed between the cylinders 2 indicated by II and III at an equal distance from the cylinders 2 indicated by II and III, and a third accelerometer is interposed between the cylinders 2 indicated by III and IV at an equal distance from the cylinders 2 indicated by III and IV. According to a second variant, the internal combustion engine 1 comprises four accelerometers 18, each of which is facing and close to a respective cylinder 2.

Substantially, the method defines an indicator α (relative to each accelerometer 18* and 18** and also indicated as detonation index I*, I** in the previous description) and an indicator β (relative to the combustion and indicated starting from the indicators α of the single accelerometers 18* and 18**, also indicated as total detonation index in the previous description).

The strategy aims to determine the indicator α for each accelerometer 18* and 18** as a function of the cylinder 2 and of the engine point that is being explored, univocally identified by the revolutions per minute (rpm) and by the load; wherein the first indicator α is variable as a function of the observability of the detonation phenomena for each accelerometer 18* and 18**; subsequently it is defined a second global indicator β of observability of the combustion at a given engine point for the cylinder 2, wherein the combustion can be fully observable by both the accelerometers 18* and 18** or by a predetermined accelerometer 18* and 18**, or can be partially observable by the two detonation accelerometers 18* and 18** or can be not observable by any of the accelerometers 18* and 18**; and finally to control the ignition advance for the cylinder 2 to the next combustion cycle, as a function of the global indicator β of observability of the combustion at the given engine point for the cylinder 2.

The global indicator β of observability of the combustion at a given engine point for a cylinder 2 is determined as a function of the indicator α for each accelerometer 18* and 18**. The above-described detonation control method has numerous advantages.

Firstly, the aforesaid control mode is individually applied to each cylinder 2. In this way it is possible to take into account the inevitable differences existing between the various cylinders 2 because of manufacturing tolerances and because of the temperature differences of the walls of the cylinders 2 due to the different position of the cylinders 2 inside the internal combustion engine 1.

Secondly, the aforesaid control mode is of simple and economical implementation in a control unit 16 of an internal combustion engine 1 and requires a modest computing capacity of the control unit 16.

In addition, the aforesaid detonation control method allows to recognize effectively the occurrence of detonation phenomena and to keep under control the detonation in the various cylinders 2 without relevant adverse effects on the combustion thermodynamic efficiency.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

The invention claimed is:

1. A method to detect and control detonation phenomena in an internal combustion engine provided with a number of cylinders and with at least two detonation sensors, in particular two accelerometers; the method comprising the steps of:
   acquiring the signal coming from each detonation sensor;
   processing the signal coming from each detonation sensor so as to determine a detonation energy for each detonation sensor;
   determining a first indicator (α) for each detonation sensor as a function of the cylinder and of the engine point that is being explored, univocally identified by the revolutions per minute and by the load; wherein the first indicator (α) is variable as a function of the observability of the detonation phenomena for each detonation sensor;
   defining a second global indicator (β) of observability of the combustion at a given engine point for a cylinder, in which the combustion can be fully observable by both detonation sensors or by a predetermined detonation sensor, or partially observable by the two detonation sensors or not observable by any of the detonation sensors; and
   controlling the ignition advance implemented for the cylinder in the next combustion cycle, as a function of the second global indicator (β) of observability of the combustion at the given engine point for the cylinder.

2. The method as set forth in claim 1, wherein the first indicator (α) is calculated as a function of a comparison between a threshold value and the detonation energy for each detonation sensor; and wherein the threshold value is determined as a function of the cylinder and of the engine point that is being explored, univocally identified by the revolutions per minute (rpm) and by the load.

3. The method as set forth in claim 1 and comprising the further step of determining, for each detonation sensor, angular windows associated with each cylinder in which to detect possible detonation phenomena; in particular, determining, for each detonation sensor, the beginning instant and the duration of the angular windows associated with each cylinder in order to detect possible detonation phenomena.

4. The method as set forth in claim 1 and comprising the further step of determining, for each detonation sensor, frequency bands associated with each cylinder in which to detect possible detonation phenomena; in particular, determining, for each detonation sensor, the minimum frequency value and the maximum frequency value associated with each cylinder in which to detect possible detonation phenomena.

5. The method as set forth in claim 1, wherein the step of processing the signal coming from each detonation sensor so as to determine a detonation energy for each detonation sensor comprises, in sequence, the sub-steps of:
  filtering, the signal coming from each detonation sensor;
  rectifying the filtered signal coming from each detonation sensor; and
  integrating the filtered and rectified signal coming from each detonation sensor so as to determine the detonation energy for each detonation sensor.

6. The method as set forth in claim 1 and, in case the combustion cycle, as a function of the cylinder and of the engine point that is being explored, is completely observable by at least two detonation sensors, the method comprises the further steps of:
  comparing the values of the detonation energy for each detonation sensor; and
  diagnosing a failure of a detonation sensor as a function of the comparison between the values of the detonation energy for each detonation sensor.

7. The method as set forth in claim 6 and, in case of a failure of a detonation sensor, comprising the further steps of:
  comparing the values of the detonation energy for each detonation sensor with respective threshold values;
  calculating the difference, in absolute value, between the values of the detonation energy for each detonation sensor and the respective threshold values; and
  diagnosing a failure of the detonation sensor having the greatest difference, in absolute value, between the value of the detonation energy and the respective threshold value.

8. The method as set forth in claim 1, wherein the first indicator ($\alpha$) is calculated through the difference between the detonation energy for each detonation sensor and the relative threshold value.

9. The method as set forth in claim 1, wherein each detonation sensor is an accelerometer, which is close to and faces the cylinders.

10. The method as set forth in claim 1, wherein the first indicator ($\alpha$) of each detonation sensor, able to observe the detonation as a function of the cylinder and of the engine point that is being explored, is greater than zero in case of a detonating combustion cycle and equal to zero in case of a non-detonating combustion cycle.

11. The method as set forth in claim 1, wherein the second global indicator ($\beta$) of observability is calculated as a function of the first indicator ($\alpha$) of each detonation sensor; in particular the second global indicator ($\beta$) of observability is determined by adding said first indicators ($\alpha$) of the detonation sensors.

12. An electronic control unit, which is designed to implement a method to detect and control detonation phenomena in an internal combustion engine made according to claim 1.

* * * * *